US012632877B2

(12) United States Patent
Sudhindra et al.

(10) Patent No.: US 12,632,877 B2
(45) Date of Patent: \*May 19, 2026

(54) GARNERING INTEREST ON POTENTIAL LISTING IN A PHOTO OR VIDEO

(71) Applicant: eBay Inc., San Jose, CA (US)

(72) Inventors: Arun Sudhindra, Mountain View, CA (US); Ashwin Ganesh Krishnamurthy, Campbell, CA (US); Avishek Gyanchand, San Jose, CA (US); Joshua Urban, San Jose, CA (US); Yotam Sharan, Tenafly, NJ (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/756,914

(22) Filed: Jun. 27, 2024

(65) Prior Publication Data

US 2024/0346539 A1 Oct. 17, 2024

Related U.S. Application Data

(63) Continuation of application No. 18/207,350, filed on Jun. 8, 2023, now Pat. No. 12,067,586, which is a
(Continued)

(51) Int. Cl.
*G06Q 30/0201* (2023.01)
*G06N 20/00* (2019.01)
(Continued)

(52) U.S. Cl.
CPC ......... *G06Q 30/0206* (2013.01); *G06N 20/00* (2019.01); *G06Q 10/40* (2026.01);
(Continued)

(58) Field of Classification Search
CPC .......... G06N 3/00–20/00; G06Q 10/00–50/00
(Continued)

(56) References Cited

U.S. PATENT DOCUMENTS 5,539,812 A * 7/1996 Kitchin ................... H04M 1/53
379/189
6,415,320 B1 * 7/2002 Hess ...................... G06Q 40/04
719/329
(Continued)

FOREIGN PATENT DOCUMENTS

CN 103985049 8/2014
JP 2010524110 7/2010
(Continued)

OTHER PUBLICATIONS

"International Search Report and Written Opinion", Application No. PCT/US2019/013655, Apr. 8, 2019, 11 pages.
(Continued)

*Primary Examiner* — Alan S Miller
(74) *Attorney, Agent, or Firm* — FIG. 1 Patents

(57) ABSTRACT

Various implementations described herein are able to leverage the interaction from one or more potential buyers relative to a digital image to automatically create a sales listing for items that appear to be of interest to the buyers. This reduces or eliminates all together the manual effort previously required of sellers in researching and collecting data on each item they wish to sell. Because of their technical nature, the innovative solutions described herein are also readily scalable which, in turn, greatly improves the seller's experience. Based on buyer interaction experiences, sales listings for each item for sale can be automatically created and listed.

20 Claims, 13 Drawing Sheets

Related U.S. Application Data continuation of application No. 17/569,355, filed on Jan. 5, 2022, now Pat. No. 11,710,144, which is a continuation of application No. 17/107,307, filed on Nov. 30, 2020, now Pat. No. 11,250,454, which is a continuation of application No. 15/886,182, filed on Feb. 1, 2018, now Pat. No. 10,885,536.

(51) Int. Cl.

| | |
|---|---|
| *G06Q 10/40* | (2026.01) |
| *G06Q 30/06* | (2023.01) |
| *G06Q 30/0601* | (2023.01) |
| *G06Q 30/08* | (2012.01) |

(52) U.S. Cl.
CPC ......... *G06Q 30/06* (2013.01); *G06Q 30/0633* (2013.01); *G06Q 30/08* (2013.01); *G06Q 30/0619* (2013.01)

(58) Field of Classification Search
USPC .............................................. 705/7.11–7.42
See application file for complete search history.

(56) References Cited

U.S. PATENT DOCUMENTS

| | | | | |
|---|---|---|---|---|
| 6,804,652 | B1* | 10/2004 | Shaffer | H04N 1/32144 396/300 |
| 7,590,695 | B2* | 9/2009 | Landsman | H04L 51/212 709/204 |
| 7,870,031 | B2* | 1/2011 | Bolivar | G06Q 30/0641 705/37 |
| 8,326,662 | B1* | 12/2012 | Byrne | G06Q 30/0278 705/7.42 |
| 8,403,217 | B2* | 3/2013 | Bennett | G06Q 30/0269 705/14.51 |
| 8,838,484 | B2* | 9/2014 | Manesh | G06Q 40/12 705/26.1 |
| 9,007,420 | B1* | 4/2015 | Passe | H04M 3/42102 379/142.05 |
| 9,235,859 | B2* | 1/2016 | Bhardwaj | G06Q 30/0643 |
| 9,536,245 | B2* | 1/2017 | Shmukler | G06Q 30/0633 |
| 9,757,644 | B2* | 9/2017 | Rose | A63F 13/00 |
| 10,002,337 | B2* | 6/2018 | Siddique | G06Q 30/0601 |
| 10,102,546 | B2* | 10/2018 | Heath | G06Q 30/0259 |
| 10,192,250 | B1* | 1/2019 | Christensen | G06Q 20/123 |
| 10,203,847 | B1* | 2/2019 | Haitani | G06Q 30/00 |
| 10,235,810 | B2* | 3/2019 | Morrison | G06Q 30/0643 |
| 10,296,994 | B2 | 5/2019 | Hodge et al. | |
| 10,362,233 | B2* | 7/2019 | Timonen | G06F 16/58 |
| 10,438,254 | B2* | 10/2019 | Jamzadeh | G06Q 30/0601 |
| 10,885,536 | B2 | 1/2021 | Sudhindra et al. | |
| 11,250,454 | B2 | 2/2022 | Sudhindra et al. | |
| 11,710,144 | B2 | 7/2023 | Sudhindra et al. | |
| 12,067,586 | B2 | 8/2024 | Sudhindra et al. | |
| 2002/0026440 | A1* | 2/2002 | Nair | G06Q 30/0601 |
| 2002/0184203 | A1* | 12/2002 | Nastar | G06Q 30/06 707/E17.02 |
| 2002/0188527 | A1* | 12/2002 | Dillard | G06Q 30/0601 705/26.1 |
| 2004/0029564 | A1* | 2/2004 | Hodge | A61K 31/505 455/563 |
| 2006/0028561 | A1* | 2/2006 | Tsunoda | H04N 1/32144 704/E15.045 |
| 2006/0285650 | A1* | 12/2006 | Hodge | H04L 63/304 379/32.01 |
| 2007/0288454 | A1* | 12/2007 | Bolivar | G06Q 30/02 707/999.005 |
| 2009/0043674 | A1* | 2/2009 | Minsky | G06Q 30/0603 715/765 |
| 2009/0216792 | A1* | 8/2009 | Grebner | G06Q 10/103 707/999.102 |
| 2009/0240735 | A1* | 9/2009 | Grandhi | G06F 16/5838 |

| | | | | |
|---|---|---|---|---|
| 2010/0179956 | A1* | 7/2010 | Jammalamadaka | G06Q 30/0603 707/E17.11 |
| 2011/0078049 | A1* | 3/2011 | Rehman | G06Q 30/0641 705/347 |
| 2011/0218851 | A1* | 9/2011 | O'Hanlon | G06Q 30/0256 707/706 |
| 2011/0288962 | A1* | 11/2011 | Rankin, Jr. | G06Q 30/02 726/28 |
| 2012/0281058 | A1* | 11/2012 | Laney | H04N 7/15 348/14.03 |
| 2013/0018709 | A1* | 1/2013 | Winslade | G06Q 30/02 705/26.2 |
| 2013/0110678 | A1* | 5/2013 | Vigier | G06Q 30/06 705/26.61 |
| 2013/0120594 | A1* | 5/2013 | Krula | G10L 15/26 348/207.1 |
| 2013/0332509 | A1* | 12/2013 | Schwartz | G07C 11/00 709/203 |
| 2013/0339199 | A1 | 12/2013 | Patt et al. | |
| 2014/0032363 | A1* | 1/2014 | Zhao | G06Q 30/0643 705/26.25 |
| 2014/0156460 | A1* | 6/2014 | Fan | G06Q 30/0623 705/26.61 |
| 2014/0254927 | A1* | 9/2014 | Bhardwaj | G06Q 30/0643 382/165 |
| 2015/0127502 | A1* | 5/2015 | Knepfle | G06Q 40/12 705/30 |
| 2015/0379612 | A1* | 12/2015 | Selinger | G06Q 30/0643 705/26.7 |
| 2016/0189267 | A1* | 6/2016 | Velusamy | G06Q 30/0623 705/26.61 |
| 2016/0299645 | A1* | 10/2016 | Shan | H04L 51/52 |
| 2016/0343049 | A1 | 11/2016 | Nair | |
| 2017/0124041 | A1* | 5/2017 | Campbell | G06F 40/18 |
| 2017/0345076 | A1* | 11/2017 | Nair | G06Q 30/0282 |
| 2018/0137561 | A1* | 5/2018 | Glazer | G06Q 30/0641 |
| 2019/0080494 | A1* | 3/2019 | Timonen | G06T 11/60 |
| 2019/0152185 | A1 | 5/2019 | Fustinoni | |
| 2019/0236628 | A1 | 8/2019 | Sudhindra et al. | |
| 2021/0081981 | A1 | 3/2021 | Sudhindra et al. | |
| 2022/0129935 | A1 | 4/2022 | Sudhindra et al. | |
| 2023/0316315 | A1 | 10/2023 | Sudhindra et al. | |

FOREIGN PATENT DOCUMENTS

| | | |
|---|---|---|
| KR | 1020120074669 | 7/2012 |
| KR | 102719970 B1 | 10/2024 |
| KR | 102904985 B1 | 12/2025 |
| WO | WO-2004001558 | 12/2003 |

OTHER PUBLICATIONS

"Non-Final Office Action", U.S. Appl. No. 15/886,182, Mar. 13, 2020, 8 pages.

"Notice of Allowance", KR Application No. 10-2022-7042123, Jul. 20, 2023, 5 pages.

10-2020-7020022, , "Notice of Allowance", KR Application No. 10-2020-7020022, Aug. 30, 2022, 7 pages.

10-2020-7020022, , "Office Action received for Korean Patent Application No. 10-2020-7020022 mailed on Feb. 24, 2022", Feb. 24, 2022, 6 Pages.

U.S. Appl. No. 15/886,182, , "Applicant Initiated Interview Summary Received for U.S. Appl. No. 15/886,182, mailed on Jun. 5, 2020", Jun. 5, 2020, 3 Pages.

U.S. Appl. No. 15/886,182, , "Notice of Allowance received for U.S. Appl. No. 15/886,182, mailed on Sep. 1, 2020", Sep. 1, 2020, 15 Pages.

U.S. Appl. No. 17/107,307, , "Notice of Allowance Received for U.S. Appl. No. 17/107,307, mailed on Oct. 8, 2021", Oct. 8, 2021, 9 Pages.

U.S. Appl. No. 17/569,355, , "Corrected Notice of Allowability", U.S. Appl. No. 17/569,355, Jun. 23, 2023, 2 pages.

U.S. Appl. No. 17/569,355, , "Non-Final Office Action", U.S. Appl. No. 17/569,355, Oct. 24, 2022, 7 pages.

(56)     References Cited

OTHER PUBLICATIONS

U.S. Appl. No. 17/569,355, , "Notice of Allowance", U.S. Appl. No. 17/569,355, Mar. 8, 2023, 7 pages.

U.S. Appl. No. 18/207,350, , "Non-Final Office Action", U.S. Appl. No. 18/207,350, Feb. 12, 2024, 10 pages.

U.S. Appl. No. 18/207,350, , "Notice of Allowance", U.S. Appl. No. 18/207,350, Apr. 4, 2024, 12 pages.

201980010946.7, , "Notice of Allowance", CN Application No. 201980010946.7, Dec. 31, 2023, 3 pages.

201980010946.7, , "Office Action", CN Application No. 201980010946. 7, Mar. 18, 2023, 9 pages.

20237036089, , "Notice of Allowance", KR Application 20237036089, Jul. 18, 2024, 6 pages.

PCT/US2019/013655, , "International Preliminary Report on Patentability received for PCT Application No. PCT/US2019/013655, mailed on Aug. 13, 2020", Aug. 13, 2020, 8 Pages.

* cited by examiner

200

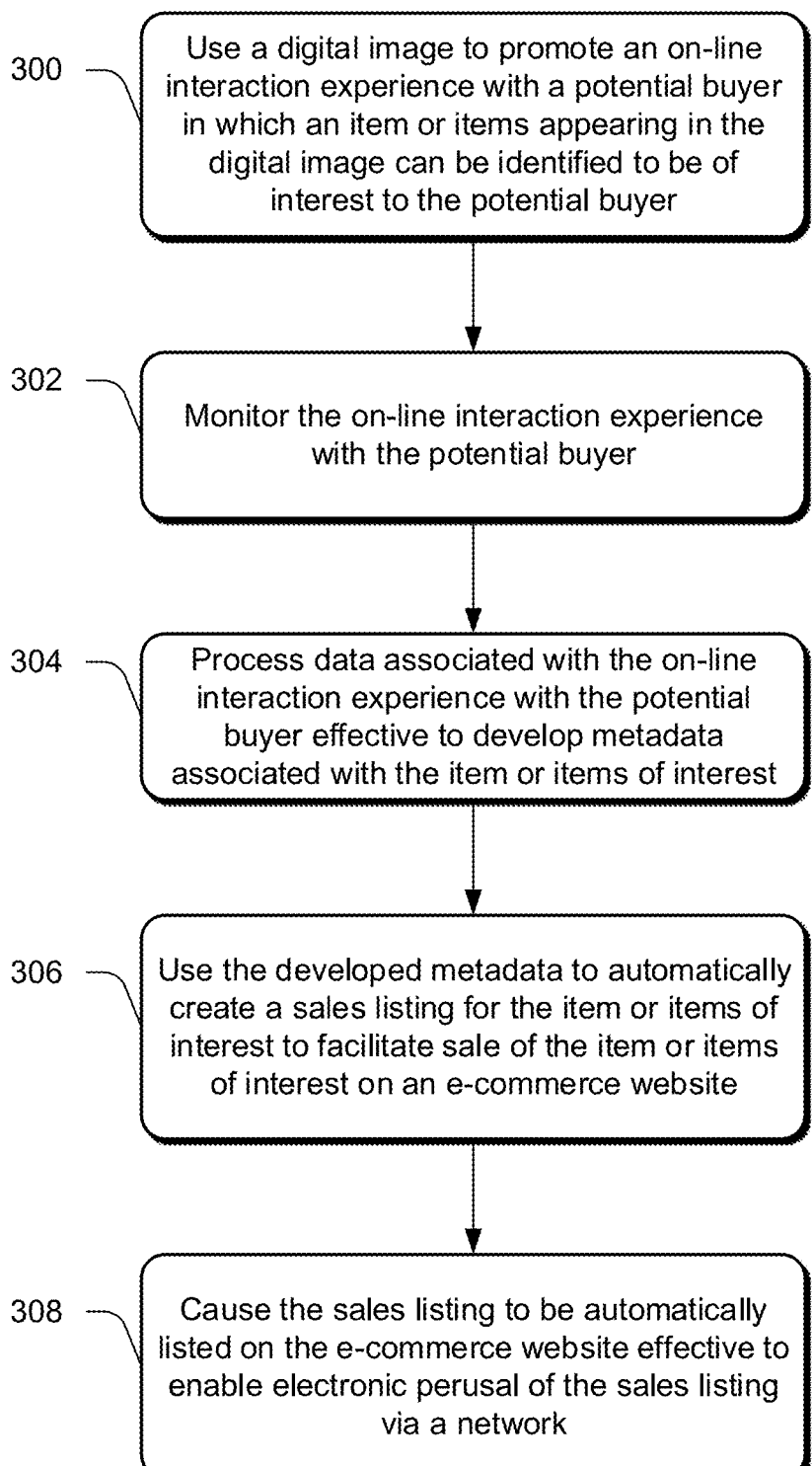

300 — Use a digital image to promote an on-line interaction experience with a potential buyer in which an item or items appearing in the digital image can be identified to be of interest to the potential buyer 302 — Monitor the on-line interaction experience with the potential buyer 304 — Process data associated with the on-line interaction experience with the potential buyer effective to develop metadata associated with the item or items of interest 306 — Use the developed metadata to automatically create a sales listing for the item or items of interest to facilitate sale of the item or items of interest on an e-commerce website 308 — Cause the sales listing to be automatically listed on the e-commerce website effective to enable electronic perusal of the sales listing via a network

Fig. 3

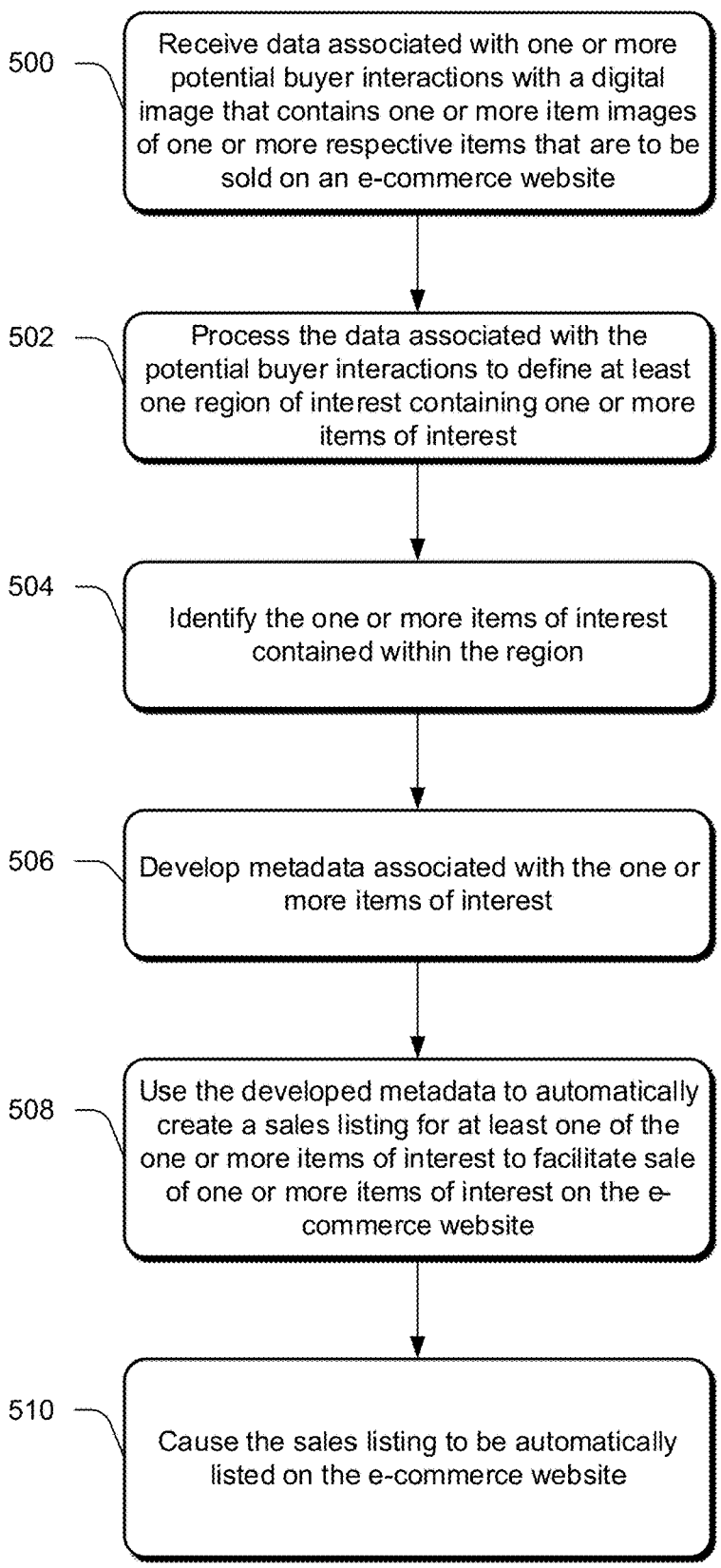

500 Receive data associated with one or more potential buyer interactions with a digital image that contains one or more item images of one or more respective items that are to be sold on an e-commerce website 502 Process the data associated with the potential buyer interactions to define at least one region of interest containing one or more items of interest 504 Identify the one or more items of interest contained within the region 506 Develop metadata associated with the one or more items of interest 508 Use the developed metadata to automatically create a sales listing for at least one of the one or more items of interest to facilitate sale of one or more items of interest on the e-commerce website 510 Cause the sales listing to be automatically listed on the e-commerce website

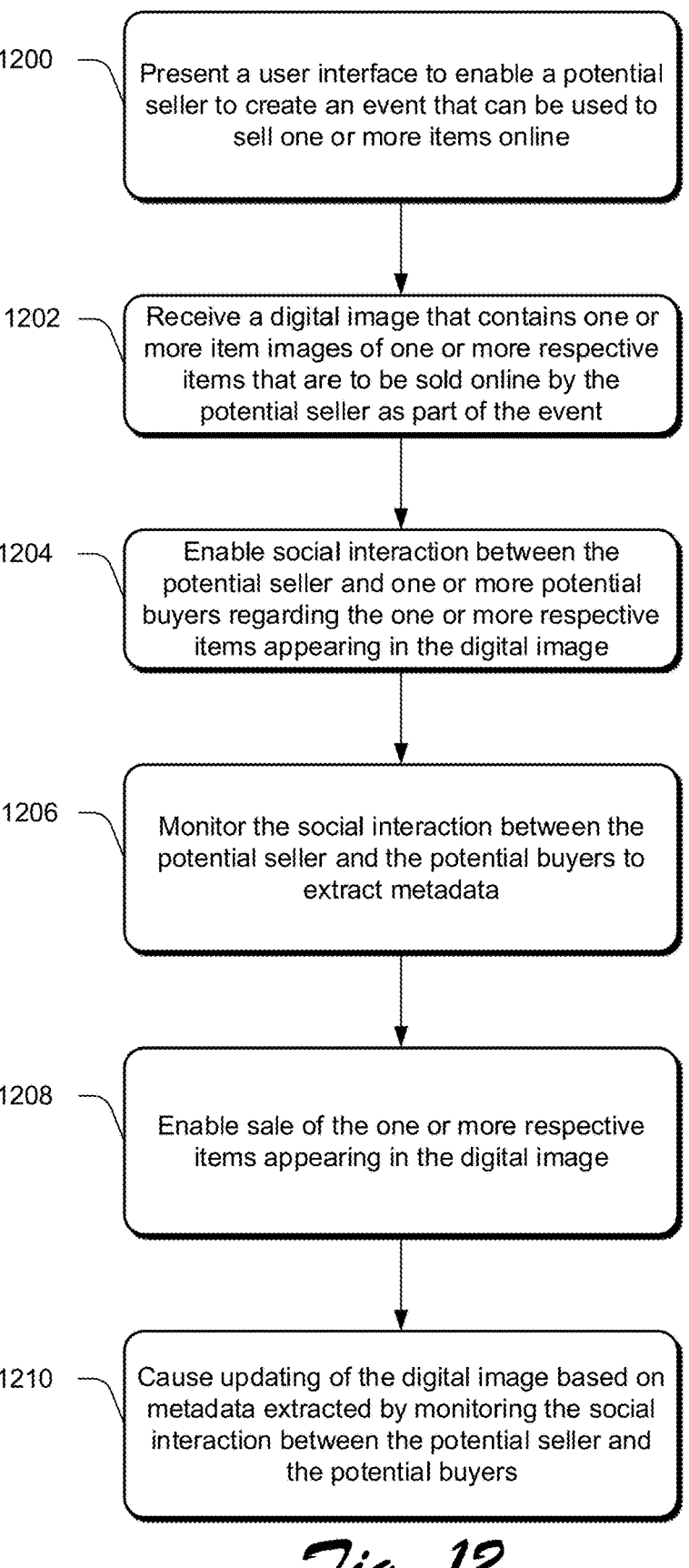

1200 — Present a user interface to enable a potential seller to create an event that can be used to sell one or more items online 1202 — Receive a digital image that contains one or more item images of one or more respective items that are to be sold online by the potential seller as part of the event 1204 — Enable social interaction between the potential seller and one or more potential buyers regarding the one or more respective items appearing in the digital image 1206 — Monitor the social interaction between the potential seller and the potential buyers to extract metadata 1208 — Enable sale of the one or more respective items appearing in the digital image 1210 — Cause updating of the digital image based on metadata extracted by monitoring the social interaction between the potential seller and the potential buyers

Platform 1316

Resources 1318

Sales Listing Creation
Module 116

Cloud
1314

Computing Device 1302

Processing
System 1304

Hardware
Elements 1310

Computer-readable
Media 1306

Memory/
Storage 1312

I/O
Interfaces 1308

Sales Listing Creation
Module 116

GARNERING INTEREST ON POTENTIAL LISTING IN A PHOTO OR VIDEO

RELATED APPLICATIONS

This application is a continuation of U.S. patent application Ser. No. 18/207,350, filed Jun. 8, 2023, entitled "Garnering Interest on Potential Listing in a Photo or Video", which is a continuation of U.S. patent application Ser. No. 17/569,355, filed Jan. 5, 2022, entitled "Garnering Interest on Potential Listing in a Photo or Video" which is a continuation of U.S. patent application Ser. No. 17/107,307, filed Nov. 30, 2020, entitled "Garnering Interest on Potential Listing in a Photo or Video" which is a continuation of U.S. patent application Ser. No. 15/886,182, filed Feb. 1, 2018, entitled "Garnering Interest on Potential Listing in a Photo or Video", the disclosures of which are incorporated by reference in this application in their entirety.

BACKGROUND

E-commerce marketplaces have struggled to improve experiences for both buyers and sellers of products. Typically, when a seller wishes to list a product for sale, they are required to perform a great deal of manual work in order to formulate a "listing" for the product they wish to sell. A "listing" typically includes a picture of the product for sale, along with the price and various other parameters, such as a description and the like. For example, oftentimes sellers have to perform manual research to find comparably-priced products so they can set a competitive price. This may involve not only searching for comparably-priced products on e-commerce sites, but also accessing and reviewing data describing buying and selling trends, consumer product preference criteria, and demand forecasts which can include both textual and graphics data such as various charts, and the like. The manual research may also require the seller to visit various websites to seek out information about the product they wish to sell. After performing this manual research, the seller must then ultimately construct their product listing and list their product on an e-commerce website.

Needless to say, this process is extremely manually-intensive, onerous, and for sellers who are unfamiliar or unacquainted with e-commerce environments, can constitute a formidable barrier to entry. Furthermore, if the seller has many items to sell, he or she must perform this process for each and every product they wish to list.

SUMMARY

Techniques for garnering interest on a potential product listing in a digital image, such as a photo or video, are described. In one or more implementations, a digital image may include one or more items that are to be sold by a seller on, for example, an e-commerce website or through some other network-based purchase experience. The digital image is used to promote an on-line interaction experience with a potential buyer in which an item or items can be identified that appear to be of interest to the buyer. Once an item is identified, metadata associated with the identified item can be automatically developed and used to automatically create a sales listing for the item to facilitate sale of the item. The sales listing can then be automatically listed on a website, such as an e-commerce website, to enable electronic perusal of the sales listing via a network.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

FIG. 3 is a flow diagram that describes operations in a sales listing creation method in accordance with one or more implementations.

FIG. 5 is a flow diagram that describes operations in a sales listing creation method in accordance with one or more implementations.

FIG. 12 is a flow diagram that describes operations in a sales listing creation method in accordance with one or more implementations.

DETAILED DESCRIPTION

Overview

Figure 1:
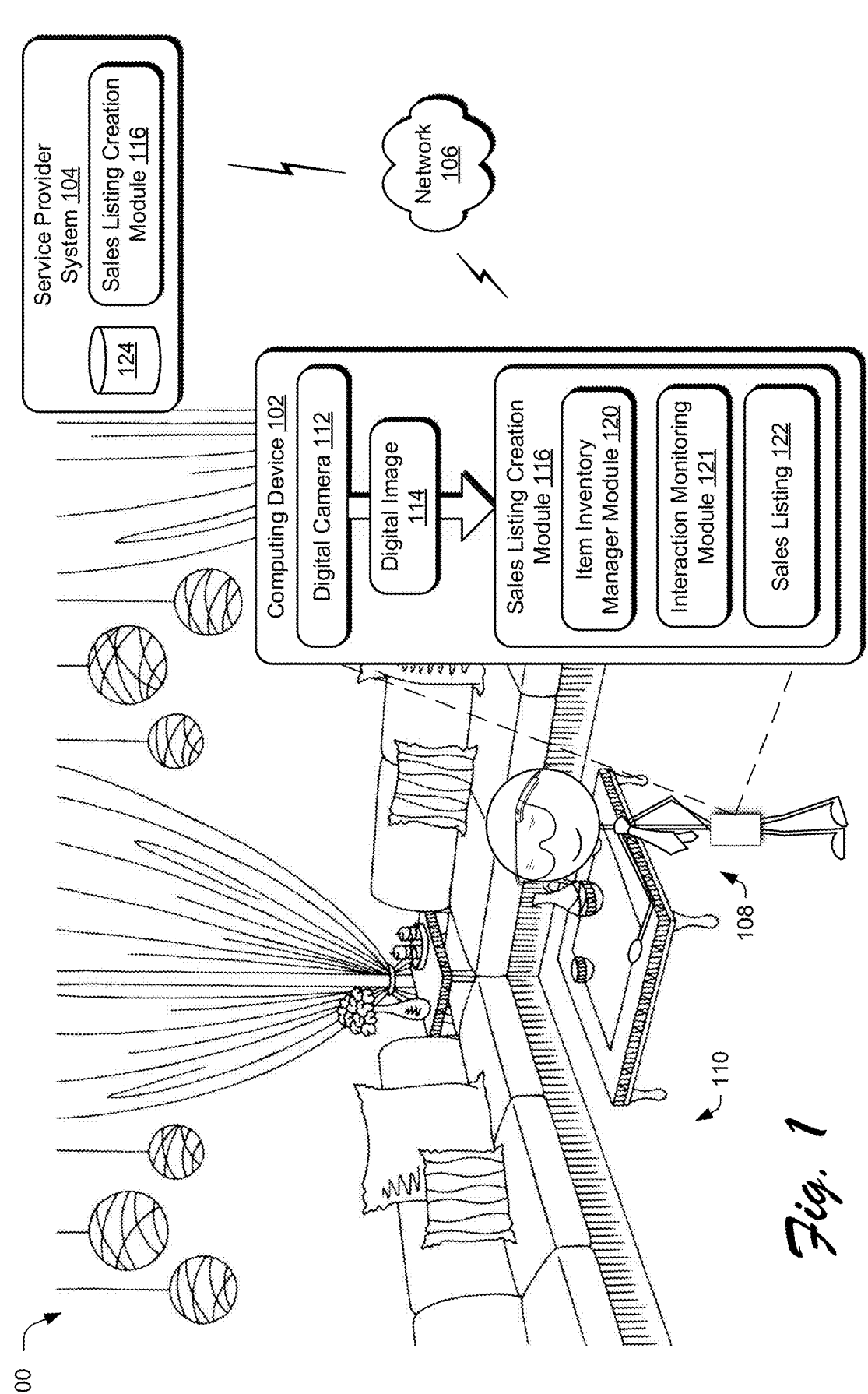
FIG. 1 is an illustration of an environment in an example implementation that is operable to employ sales listing techniques described herein.

Techniques for garnering interest on a potential product listing in a digital image, such as a photo or video, are described. In one or more embodiments, a digital image may include one or more items that are to be sold by a seller on, for example, an e-commerce website or through some other network-based purchase experience. The digital image can reside in the form of a photo, video, a still frame captured from a video, and the like. The digital image is used to promote an on-line interaction experience with a potential buyer in which an item or items can be identified that appear to be of interest to the potential buyer. Various different types of interaction experiences can be promoted using the digital image. For example, one such interaction experience can include a social interaction between the seller and the potential buyer. The social interaction can include, by way of example and not limitation, a textual chat session, an on-line voice conversation, a peer-to-peer conversation, and the like. Another such interaction experience can include the manner in which the potential buyer interacts with the digital image. For example, when presented with a digital image, a potential buyer may zoom in on a particular item of interest. Alternately or additionally, the potential buyer may zoom in on a region of the digital image that includes multiple items.

Once an item(s) is identified, metadata associated with the identified item can be automatically developed and used to automatically create a sales listing for the item to facilitate sale of the item. In various implementations, the sales listing can be the first initial sales listing for an item, where a sales listing for that item did not previously exist. The metadata can be developed in a variety of different ways, examples of which are provided below. The sales listing can then be automatically listed on a website, such as an e-commerce website, to enable electronic perusal of the sales listing via a network. In addition, in various implementations, the sales listing can be listed on multiple different platforms, systems, and sites. Whether listed on a single website or multiple different websites, the sales listing can be continuously updated automatically, based on buyer interactions with the sales listing and/or the digital image from which the sales listing was created. For example, in an instance where the sales listing is listed on multiple different websites, when a buyer interaction causes a modification of the sales listing, that modification can be communicated by the particular website on which the interaction occurred, or through an intermediary such as a monitoring bot, to the other websites either directly or indirectly so that the sales listing can remain synchronized across the multiple websites.

Thus, various implementations are able to leverage the interaction from one or more potential buyers relative to a digital image to automatically create and update a sales listing for items that appear to be of interest to the buyers. This reduces or eliminates, all together, the manual effort previously required of sellers in researching and collecting data on each item they wish to sell. Because of the technical nature of the innovative solutions described herein, the solutions are readily and quickly scalable which, in turn, greatly improves the seller's experience. Thus, the solutions can transform computing devices into powerful mechanisms to facilitate the exchange of items and money.

For example, a seller may have a large number of items they wish to sell. In the past, the seller would be required to manually research each and every item in order to intelligently prepare an informed sales listing. Now, through the innovative solutions described herein, a seller may simply take one photograph or make one video that includes all of the items for sale. Based on buyer interaction experiences, sales listings for each item for sale can be automatically created and listed.

As such, the described innovations improve upon the current state-of-the-art for a number of different reasons. For example, the described innovations are extremely helpful and very apt for casual sellers who may not necessarily be comfortable in, or knowledgeable about identifying items that they can sell. The technical solutions described herein automatically take care of all of the details for these types of sellers. In addition, because of the technical nature of the innovations, for sellers who do not have the time to manage and list all of the items they wish to sell, the innovative solutions provide a "one-stop" process in which a single digital image can serve as the starting point for an automatically-created, automatically-listed sales listing for one or more items. Accordingly, no longer are potential sellers required to manually search for comparably-priced products on e-commerce sites, access and review data describing buying and selling trends, consumer product preference criteria, and demand forecasts. Potential sellers are also relieved of the burden of visiting various websites to seek out information about the product they wish to sell. The innovative technical solutions thus emphasize and promote speed, efficiency, and ease of usability for sellers in an e-commerce setting.

In the following discussion, an example environment is first described that may employ the techniques described herein. Example procedures and systems are also described and shown as blocks which may be performed in the example environment as well as other environments. Consequently, performance of the example procedures is not limited to the example environment and systems and the example environment and systems are not limited to performance of the example procedures.

Example Environment

FIG. 1 is an illustration of a digital medium environment 100 in an example implementation that is operable to employ techniques to garner interest on a potential listing in a photo or video described herein. The illustrated environment 100 includes a computing device 102 that is communicatively coupled to a service provider system 104 via a network 106. Computing devices that implement the computing device 102 and the service provider system 104 may be configured in a variety of ways.

A computing device, for instance, may be configured as a desktop computer, a laptop computer, a mobile device (e.g., assuming a handheld configuration such as a tablet or mobile phone), configured to be worn (e.g., as goggles) and so forth. Thus, a computing device may range from full resource devices with substantial memory and processor resources (e.g., personal computers, game consoles) to a low-resource device with limited memory and/or processing resources (e.g., mobile devices). Additionally, although a single computing device is shown, a computing device may be representative of a plurality of different devices, such as multiple servers utilized by a business to perform operations "over the cloud" for the service provider system 104 as described in FIG. 13.

The computing device 102 is illustrated as being held by a user 108 in a physical environment, e.g., a living room 110. The computing device 102 includes a digital camera 112 that is configured to capture digital images 114 of an outside physical environment (e.g., the living room 110), such as through use of a charge coupled device (CCD) sensor or video camera. The captured digital images 114 may then be stored in a computer-readable storage medium and/or rendered for display by a display device, e.g., LCD, OLED, LED, etc. The digital image or images may include one or more items, such as the illustrated coffee table, and cup and pitcher resting on the coffee table that are to be sold by the user 108 which, in this case, is the "seller".

The computing device 102 also includes, in at least some implementations, a sales listing creation module 116 that is configured to process digital image 114 using item inventory manager module 120, to identify one or more items that are to be sold by a seller on, for example, an e-commerce website or through some other network-based purchase experience. In some implementations, the sales listing creation module 116 includes an interaction monitoring module 121 that monitors interaction experiences associated with a particular item or items. As noted above, various different types of interaction experiences can be monitored. For example, one such interaction experience can include a social interaction between the seller and a potential buyer.

Alternately or additionally, another such interaction can include the manner in which a potential buyer interacts with digital image 114.

The sales listing creation module 116 is configured to use information ascertained from item inventory manager module 120 and interaction monitoring module 121 to automatically create a sales listing 122 that can be used to sell the item or items on the E-commerce website, as described in more detail below. Alternately or additionally, aspects of the sales listing creation module 116 can be implemented by a third party, such as by the service system provider 104. In some implementations, aspects of the sales listing creation module 116 can be distributed between computing device 102 and service provider system 104. That is, in some instances some modules that contribute to the creation of sales listing 122 may reside on a computing device 102, while other modules may reside on the service provider system 104. For ease of description, however, the modules are shown as residing on computing device 102.

The item inventory manager module 120 is representative of functionality to manage an inventory of items. This includes items that are owned by the user 108 that the user wishes to sell. In one or more implementations, the item inventory manager module 120 is configured to collect or otherwise analyze digital images 114. This may include digital images 114 of physical items in the living room 110 in this example, or digital images captured of physical photos of items the user wishes to sell. The digital image 114 may also be captured from a user interface output by the computing device 102, e.g., as a screenshot from a frame buffer provided by an application, an example of which is provided below.

In one or more implementations, the item inventory manager module 120 includes item recognition functionality to recognize items included within the digital image 114, e.g., via machine learning. Broadly, "machine learning" refers to a field of computer science that gives computers the ability to learn without being explicitly programmed. Many different types of machine learning can be utilized in various implementations, as will be appreciated by the skilled artisan.

Machine learning tasks are typically classified into two broad categories, depending on whether there is a learning "signal" or "feedback" available to a learning system. The first category is referred to as "supervised learning", and the second category is referred to as "unsupervised learning."

In supervised learning, the computer is presented with example inputs and their desired outputs, given by a "teacher". The goal is to learn a general rule that maps inputs to outputs. As special cases, the input signal can be only partially available, or restricted to special feedback. The special feedback can include semi-supervised learning, active learning, and reinforcement learning. In unsupervised learning, no labels are given to the learning algorithm, leaving it on its own to find structure in its input. Unsupervised learning can be a goal in itself, e.g., discovering hidden patterns in data, or a means towards an end, e.g., feature learning.

Another categorization of machine learning tasks arises when one considers the desired output of a machine-learned system. This can include such things as classification, regression, clustering, density estimation, and dimensionality reduction. Needless to say, numerous different machine learning techniques can be employed by the item inventory manager module 120 to recognize items that appear in digital image 114.

From its machine learning analysis and item recognition of the digital image 114, the item inventory manager module 120 may collect data pertaining to this recognition, as well as other information, such as information developed by interaction monitoring module 121. In one or more implementations, this data and other information can be used to automatically create a sales listing 122 for the item. A typical sales listing will include an image of the item and the item price. Other information may be included as well such as, by way of example and not limitation, an item description, item condition, packaging, item watchers, feedback, trending price, delivery expectation, warranty information, and the like.

In one or more implementations, the sales listing creation module 116 includes functionality, e.g., the interaction monitoring module 121, to monitor a social interaction between the user (seller) and one or more potential buyers. From this monitored social interaction, the item inventory manager module 120 is then able to identify items for sale and collect data pertaining to the identified data in order to automatically create sales listing 121.

Alternately or additionally, in one or more implementations, data describing the recognized items, for instance, may be communicated via the network 106 to the service provider system 104. The service provider system 104 may include a sales listing creation module 116 that is configured to obtain data related to the items (e.g., through use of a search) from a storage device 124 or from other sources such as other E-commerce websites, various webpages, and the like. This data may then be communicated back to the computing device 102 via the network 106 for use by the item inventory manager module 120 in automatically creating the sales listing 122. Alternately or additionally, the service provider system 104 may automatically create the sales listing, thus relieving the computing device 102 from having to create and list the sales listing.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Sales Listing Creation

Figure 2:
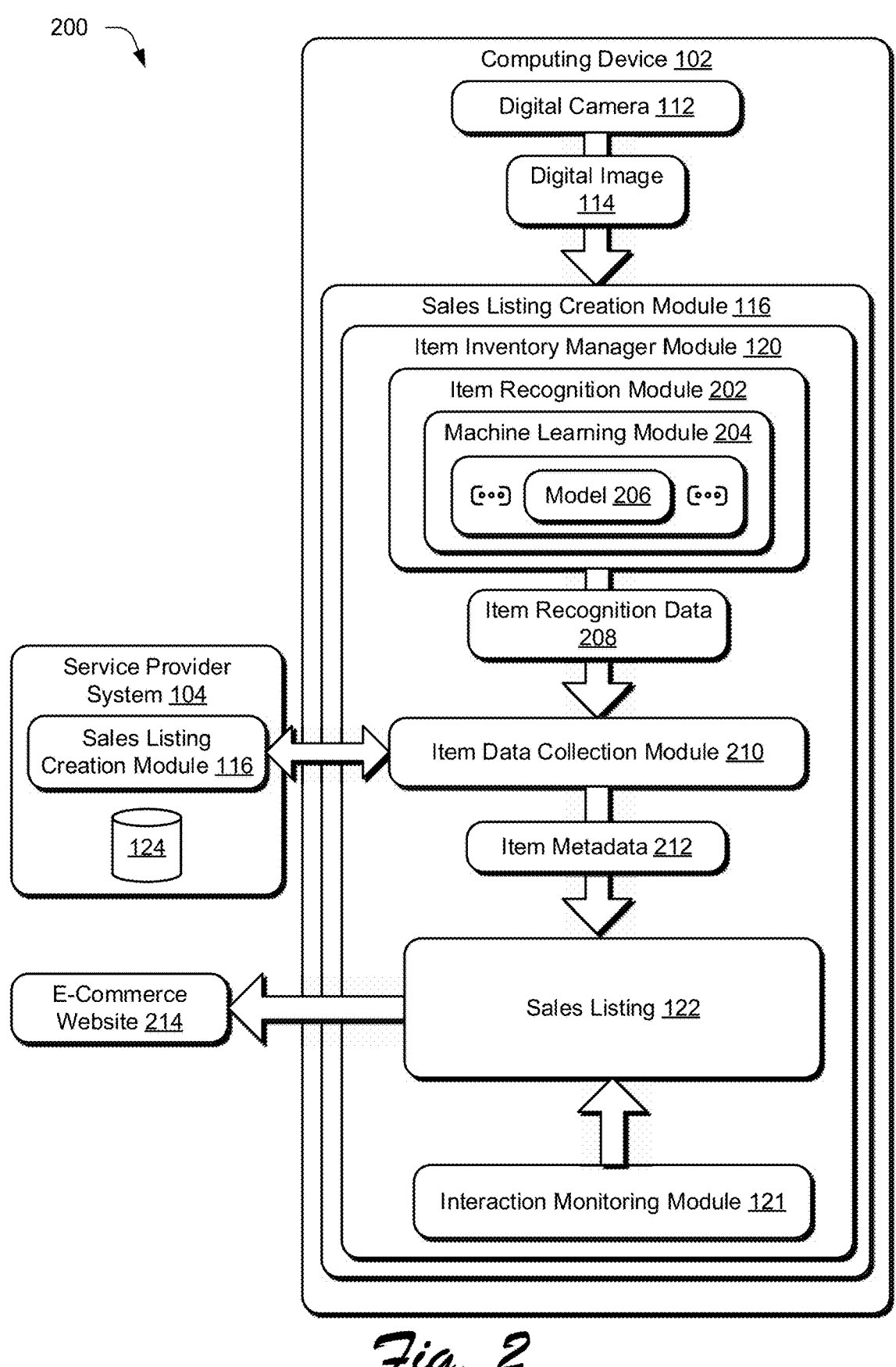
FIG. 2 depicts a system in an example implementation showing operation of a sales listing creation module of FIG. 1 in greater detail.

FIG. 2 depicts a system 200 in an example implementation showing operation of the sales listing creation module 116 of FIG. 1 in greater detail. The following discussion describes techniques that may be implemented utilizing the previously described systems and devices. Aspects of the procedure as shown stepwise by the modules of FIG. 2 may be implemented in hardware, firmware, software, or a combination thereof. The procedure is shown as a set of blocks that specify operations performed by one or more devices and are not necessarily limited to the orders shown for performing the operations by the respective blocks.

To begin, a digital image 114 is obtained by the digital camera 112. The digital image 114, for instance, may be captured using a digital camera, as a screenshot captured from a frame buffer of the computing device 102, a digital picture of one or more items, and so forth.

The digital image 114 is then processing by a sales listing creation module 116 to automatically create a sales listing 122. The sales listing creation module 116 may reside on the computing device 102, service provider system 104, or have aspects of its functionality distributed between computing device 102 and service provider system 104.

The item inventory manager module 120 includes an item recognition module 202 configured to recognize an item within the digital image 114. The item recognition module 202, for instance, may employ a machine learning module 204 configured to employ models 206 usable to recognize the item using machine learning, e.g., neural networks, convolutional neural networks, deep learning networks, structured vector machines, decision trees, and so forth. The models 206, for instance, may be trained using training digital images that are tagged with corresponding identifications. In an implementation, these training digital images and tags are obtained from a commerce service provider system that are tagged by sellers using the system. As a result, a multitude of accurately tagged training digital images may be obtained with minimal computation and user cost as opposed to conventional manual tagging techniques. Although illustrated as implemented locally by the computing device 102, as noted above, this functionality may also be implemented in whole or in part by a service provider system 104 via the network 106.

Thus, the item recognition data 208 describes an item included in the digital image 114. An item data collection module 210 is then employed to collect item metadata 212 that pertains to the recognized item. This may be performed locally through a search of a local storage device and/or remotely through interaction with a sales listing creation module 116 of a service provider system 104 via a network 106.

Alternately or additionally, in at least some implementations, an interaction monitoring module 121 also develops data which can be used to enable the item data collection module 210 to collect item metadata to be used in the sales listing 122. That is, as noted above, the digital image is used to promote an on-line interaction experience with a potential buyer in which an item or items can be identified that appear to be of interest to the potential buyer. Various different types of interaction experiences can be promoted using the digital image, and the interaction monitoring module 121 can be configured to monitor each or any different type of interaction experience. For example, one such interaction experience can include a social interaction between the seller and the potential buyer. The social interaction can include, by way of example and not limitation, a textual chat session, an on-line voice conversation, a peer-to-peer conversation, and the like. During the social interaction, the interaction monitoring module can monitor the conversation for contextual data, such as keywords, the use of emojis, and the like, to enable the item data collection module 210 to develop item metadata. Another such interaction experience can include the manner in which the potential buyer interacts with the digital image. For example, when presented with a digital image, a potential buyer may zoom in on a particular item of interest. Alternately or additionally, the potential buyer may zoom in on a region of the digital image that includes one or more items. In this instance, the interaction monitoring module 121 can monitor the buyer's interaction with the digital image. This can take place using various techniques. For example, as a buyer interacts with a digital image, data describing the interaction such as a "zoom" action can be produced. From this data, the interaction monitoring module 121 can ascertain that a buyer has zoomed in on a particular item or region of a digital image. From there, the item or region can be isolated and analyzed in more detail to enable the item data collection module 210 to develop the item metadata 212.

A variety of different types of item metadata 212 may be obtained from a variety of different types of service provider systems 104. In one example, the service provider system 104 provides information relating to purchase or sale of the item, e.g., product name, product description, price for purchase or sale (e.g., based on online auctions), and so forth. In another example, the service provider system 104 provides information relating to customer reviews of the product, e.g., a number of "stars" or other rating, textual reviews, and so forth.

The item metadata 212 in this example is then processed by the item inventory manager module 122 to automatically create a sales listing 122 for the item to facilitate sale of the item. The sales listing can then be automatically listed on an E-commerce website 214.

Accordingly, the various implementations described above and below are able to leverage the interaction from one or more potential buyers relative to a digital image to automatically create a sales listing for items that appear to be of interest to buyers. This reduces or eliminates the manual effort previously required of sellers in researching and collecting data on each item they wish to sell.

Having considered an example system in accordance with one or more implementations, consider now an example method in accordance with one or more implementations.

FIG. 3 is a flow diagram that describes operations in accordance with one or more implementations. The operations can be performed in connection with any suitable hardware, software, firmware, or combination thereof. In at least some implementations, the operations can be implemented by a system, such as those systems described above and below.

At block 300, a digital image is used to promote an on-line interaction experience with a potential buyer in which an item or items appearing in the digital image can be identified to be of interest to the potential buyer. The on-line interaction experience is associated with the digital image and can include, by way of example and not limitation, a buyer's interaction with the digital image itself, a social interaction between the buyer and the seller, and the like. This operation can be performed in any suitable way. For example, this operation can be performed by causing the digital image to be presented on a computing device associated with the potential buyer. For example, a service provider system 104 may maintain a website in which digital images have been uploaded by various sellers. The potential buyer may then navigate to the website and select a particular digital image for electronic perusal. Alternately or additionally, a potential seller may transmit, or have transmitted on their behalf, a digital image to a potential buyer during the course of a social interaction. In at least some implementations, the on-line interaction experience is used to automatically create a sales listing for the item or items, where a sales listing did not previously exist for the item or items. That is, the on-line interaction experience is used to automatically create an initial sales listing for item that is to be sold. At block 302, the on-line interaction experience with the potential buyer is monitored. This operation can be performed in any suitable way, examples of which are provided above and below.

At block 304, data associated with the online interaction experience with potential buyer is processed, effective to develop metadata associated with the item or items of interest. Examples of such metadata are provided above and below. At block 306, the developed metadata is used to automatically create a sales listing for the item or items of interest. The sales listing is designed to facilitate sale of the items or items of interest on an E-commerce website. Again, in one or more implementations, the sales listing that is automatically created is an initial sales listing, where one did not previously exist for the item or items.

At block 308, the sales listing is caused to be automatically listed on the E-commerce website. Doing so effectively enables electronic perusal of the sales listing via a network.

The automatic method described above greatly reduces the extent to which a seller must manually research and develop their own particular sales listing. In doing so, the innovative solutions provide a highly scalable, effective, fast, and efficient approach to bringing buyers and sellers together.

Having considered the above-described systems and methods, consider now two implementation examples that draw upon the principles just described. The first example pertains to leveraging a buyer's interaction with a digital image itself, to automatically create the sales listing. The second example pertains to enabling sales of items appearing in a digital image based upon interaction between the seller and one or more potential buyers.

Figure 4:
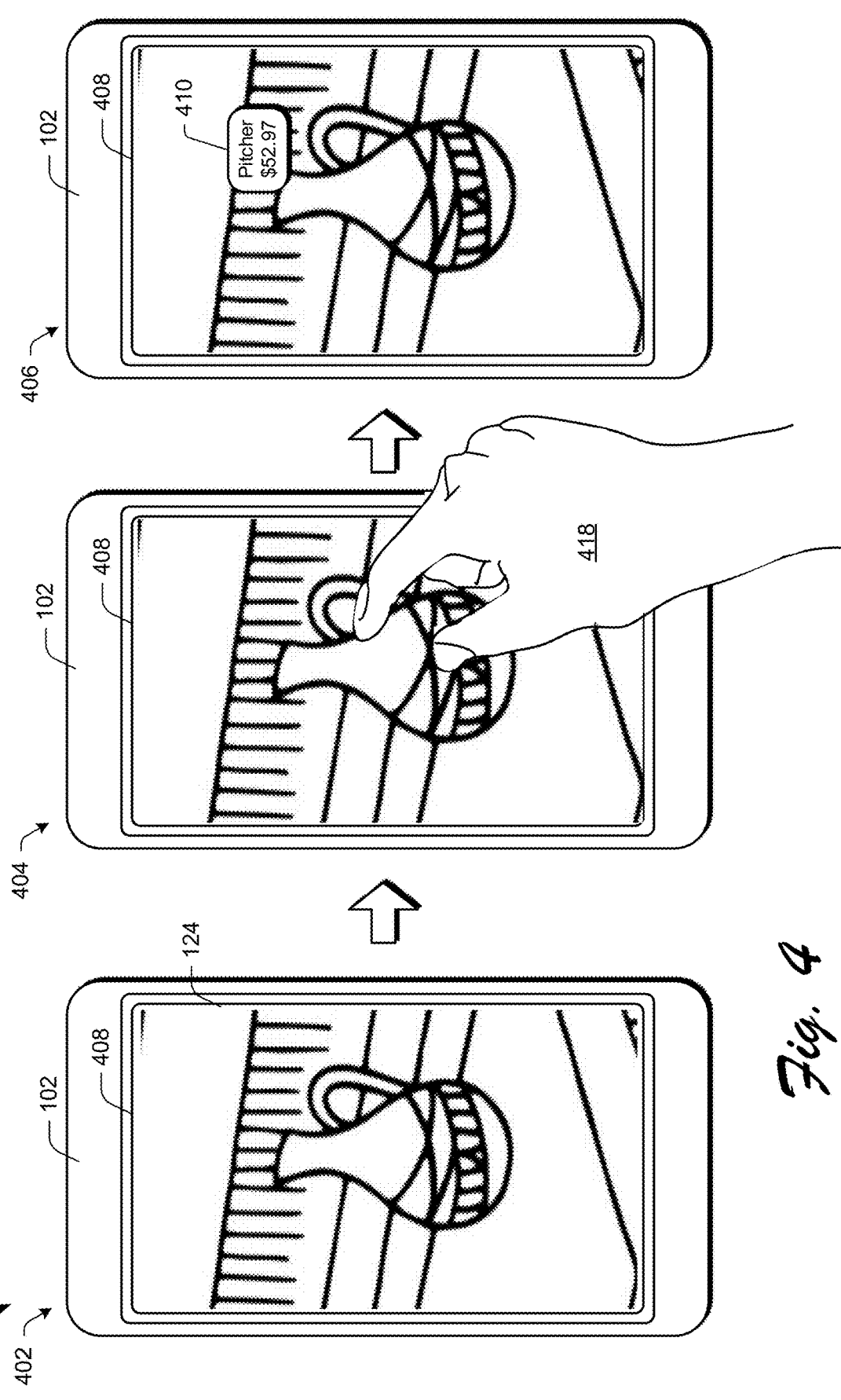
FIG. 4 depicts an example online interaction experience in accordance with one or more implementations.

Leveraging a Buyer's Interaction with a Digital Image to Automatically Create the Sales Listing FIG. 4 depicts an example implementation 400 of user interaction, e.g. an online interaction experience, with a digital image that has been captured as described above. In this particular example, a digital image has been taken of the coffee table appearing in FIG. 1 and the items appearing on the coffee table. This implementation 400 is illustrated using first, second, and third stages 402, 404, 406.

At the first stage 402, a user interface 408 is output by the computing device 102, e.g., by way of a touchscreen display device. The user interface 408 may be configured as a "live feed" of digital images 114 obtained in real time from the digital camera 112 in this example.

At the first stage 402, the user, in this case a potential buyer, has selected the digital image that contains the coffee table and the items appearing thereon.

At the second stage 404, a user input is received that selects an item displayed in the user interface 408. This selection can be conveyed to a service provider system by way of a suitable API call into the service provider system. In this particular case, the user has zoomed up on the digital image by way of a zoom operation. In the illustrated example, the user input is detected as a tap of a finger of the user's hand 418 that is detected using touchscreen functionality of the computing device. The touchscreen functionality, or any other suitable input, generates data associated with one or more potential buyer interactions with the digital image. In this way, a user may distinguish between multiple items displayed concurrently in the user interface 408. Other examples may also be used, such as a spoken utterance or other gestures. In addition, a potential buyer need not select only one item. Rather, the potential buyer may zoom the digital image such that multiple different items appear in a region of the image.

In response to the user selection of the second stage 404, the digital image 114 or, more accurately, the data associated with the potential buyer interactions, is then processed by the item recognition module 202 at the service provider system, as described above, to identify the item (e.g., the pitcher in the illustrated example) as item recognition data

208. The item recognition module 202 can also process the data associated with the potential buyer interactions to define at least one region of interest containing an item or items of interest. These items appearing in the region can then be processed by the item recognition module 202 as described above, to identify the items.

The item recognition data 208 can be processed by the item inventory manager module 120 of the service provider system to develop metadata associated with the item or items of interest. Accordingly, the service provider system 104 in this example searches a storage device 124 for item metadata 212 that pertains to the identified item. The item metadata 212 is then used to automatically create a sales listing for the item of interest to facilitate sale of the item on an E-commerce website.

As shown at the third stage 406, an example sales listing is shown that includes a picture of the item, in this case the pitcher, along with a name and price 410 (e.g., average price, price for sale, price to buy, etc.) of the item. In addition, the sales listing can include other information such as that described above, e.g., a product description, a link to comparable items, suggested comparable items along with associated prices, and the like.

FIG. 5 is a flow diagram that describes operations in accordance with one or more implementations. The operations can be performed in connection with any suitable hardware, software, firmware, or combination thereof. In at least some implementations, the operations can be implemented by a system, such as those systems described above and below.

At block 500, data is received associated with one or more potential buyer interactions with a digital image. The digital image contains one or more item images of one or more respective items that are to be sold on an e-commerce website. Any suitable type of potential buyer interaction can generate the received data. In at least some embodiments, the interaction can comprise a touch-related input. Alternately or additionally, the interaction can be a verbal action, a gesture, a natural user interface input, and the like. At block 502, the data associated with the potential buyer interactions is processed to define at least one region of interest containing one or more items of interest. For example, a potential buyer may simply zoom into a region that contains multiple items of interest. Alternately or additionally, a potential buyer may zoom into a region that contains only one item of interest. Alternately or additionally, the buyer may tap-select a particular item appearing in a digital image.

At block 504, the item or items of interest contained within the region are identified and, at block 506, metadata associated with the item or items of interest is developed. Examples of how this can be done are provided above. For example, various machine learning techniques can be utilized to identify the item or items of interest. Additionally, metadata developed therefrom can be acquired from any suitable source such as, by way of example and not limitation, the e-commerce website on which the sales listing is to be listed or a source other than the e-commerce website.

At block 508, the developed metadata is used to automatically create a sales listing for the item of interest to facilitate sale of the item of interest on the e-commerce website. At block 510, the sales listing is caused to be automatically listed on the e-commerce website. This operation can be performed in a variety of different ways. For example, if the sales listing is automatically created on a computing device, such as computing device 102, the sales listing can be caused to be listed by transmitting the sales listing to the e-commerce website or a representative thereof. If, on the other hand, the sales listing is developed by the e-commerce website or a representative thereof, the sales listing can be caused to be listed by simply taking the normal steps that are undertaken to list a sales listing.

Having considered the above-described implementation, consider now an implementation that enables sales of items appearing in a digital image based upon interaction between the seller and one or more potential buyers.

Figure 6:
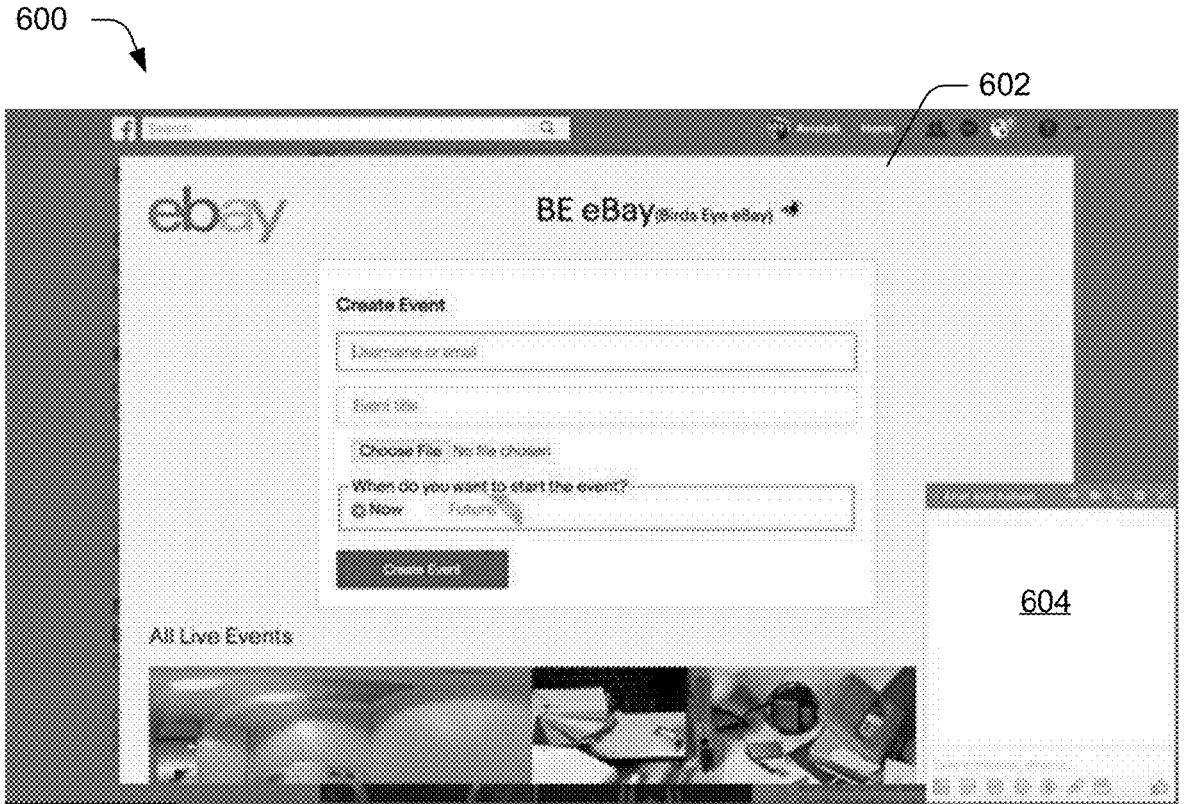
FIG. 6 illustrates an example user interface in accordance with one or more implementations.

Enabling Sales of Items Appearing in a Digital Image Based Upon Interaction Between the Seller and One or More Potential Buyers In at least some implementations, a digital image can be utilized to promote an online interaction experience in the form of a social interaction between the seller and one or more potential buyers. As noted above, the social interaction can include, by way of example and not limitation, a textual chat session, an on-line voice conversation, a peer-to-peer conversation, and the like. As an example, consider FIG. 6.

There, a social media user interface is shown generally at 600. Any suitable type of social media user interface can be utilized. Alternately or additionally, any suitable type of application that can enable on-line, social interaction between two or more users can be utilized. In this particular example, a user—in this case a seller—has chosen to create an "event" and, as such, an event user interface is presented at 602. The event user interface enables the user to sign in, provide an event title, and select resources, such as an image file containing one or more digital images. An "event" is a construct through which the seller can present items that they wish to sell and engage in an on-line interaction experience with a potential buyer in an effort to sell the items. In this particular example, the on-line experience is promoted by way of a user interface component 604 which enables a textual chat session between two or more people. In addition, the event enables items to be identified and, at the same time, sales listings for the items to be automatically created and listed on one or more e-commerce websites, as described above and below.

Figure 7:
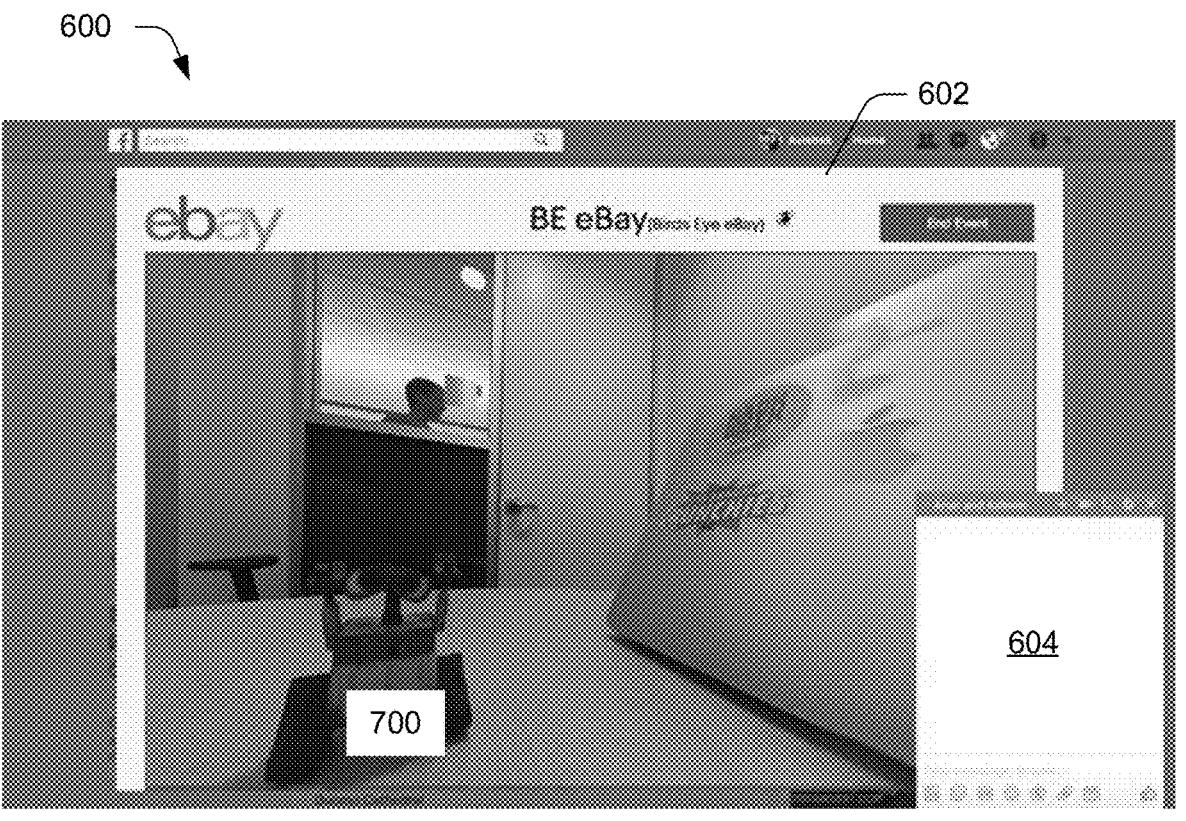
FIG. 7 illustrates an example user interface in accordance with one or more implementations.

Once the seller creates the event, he or she can upload a digital image that contains items that the seller wishes to sell. Any suitable type of digital image can be utilized including, by way of example and not limitation, a photograph, a 360-degree photograph, a video, a frame from a video, and the like. As an example, consider FIG. 7.

Figure 8:
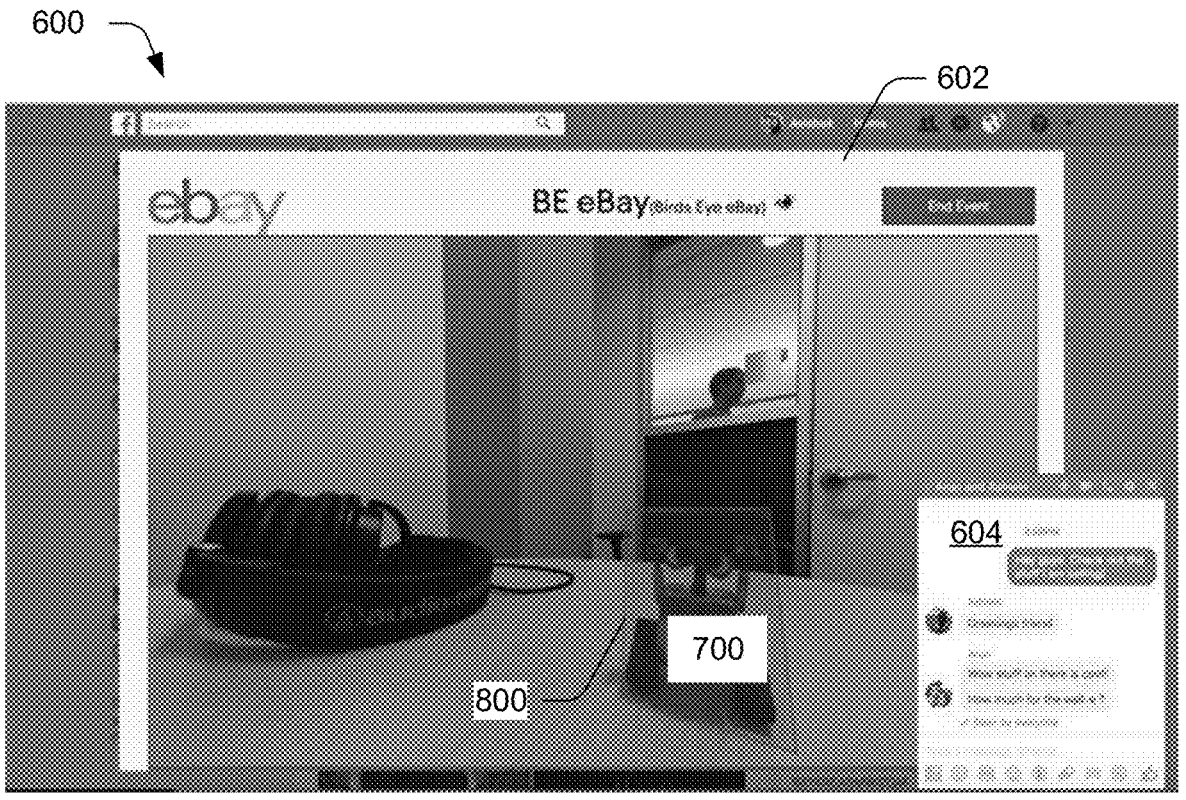
FIG. 8 illustrates an example user interface in accordance with one or more implementations.

There, the user has uploaded an image with on-sale items. In this case, an item 700 (WALL-E) is going to be listed for sale. At this point, the seller has not yet created his or her inventory and has not gone through any type of selling process. Specifically, at this point in the process, a sales listing for item 700 does not exist. Rather, the seller has simply uploaded a digital image containing one or more items that are to be sold and for which sales listings are to be created. At this point in the event, the seller chooses to initiate a dialogue with friends. As an example, consider FIG. 8.

There, the seller has chosen to initiate an online interaction experience with a friend by way of user interface component 604. In this instance, during the online interaction experience the potential buyer expresses an interest in item 700 by asking "How much for the WALL-E?". During this on-line interaction experience with the potential buyer, a system, such as the system described above, monitors the on-line interaction experience and processes data associated with the interaction experience. Monitoring the on-line interaction experience takes place by way of an event loop which continuously monitors the interaction experience.

This can be done through any suitable technique. In this particular example, an item inventory manager module 120 (FIG. 2) can monitor the textual conversation between the seller and the potential buyer or buyers through, for example, natural language processing techniques, and can use the monitored data—in this case, keywords that are utilized in the conversation—to develop metadata associated with the item or items of interest. The item inventory manager module 120 can also monitor for other things such as the use of emojis (e.g., a smiley face when a price is mentioned by the seller), and the like. Any suitable techniques can be utilized to develop metadata, examples of which are provided above. Specifically, in some implementations, image recognition module 202 and machine learning module 204 can operate to develop metadata associated with the item or items of interest. In at least some implementations, the event loop continuously monitors and collects product metadata including things such as interest, price, condition, and the like.

In addition to identifying the item or items of interest, in at least some embodiments, the item of interest can be highlighted as indicated at 800. There, a shaded, visual box has been drawn around the item to draw the participants' attention to the item currently being discussed.

During this time, the system uses the developed metadata to automatically create a sales listing for the item or items of interest to facilitate sale of the item or items of interest on an e-commerce website. Once the sales listing is automatically created, the system can cause the sales listing to be automatically listed on the e-commerce website effective to enable perusal of the sales listing via a network.

Figure 9:
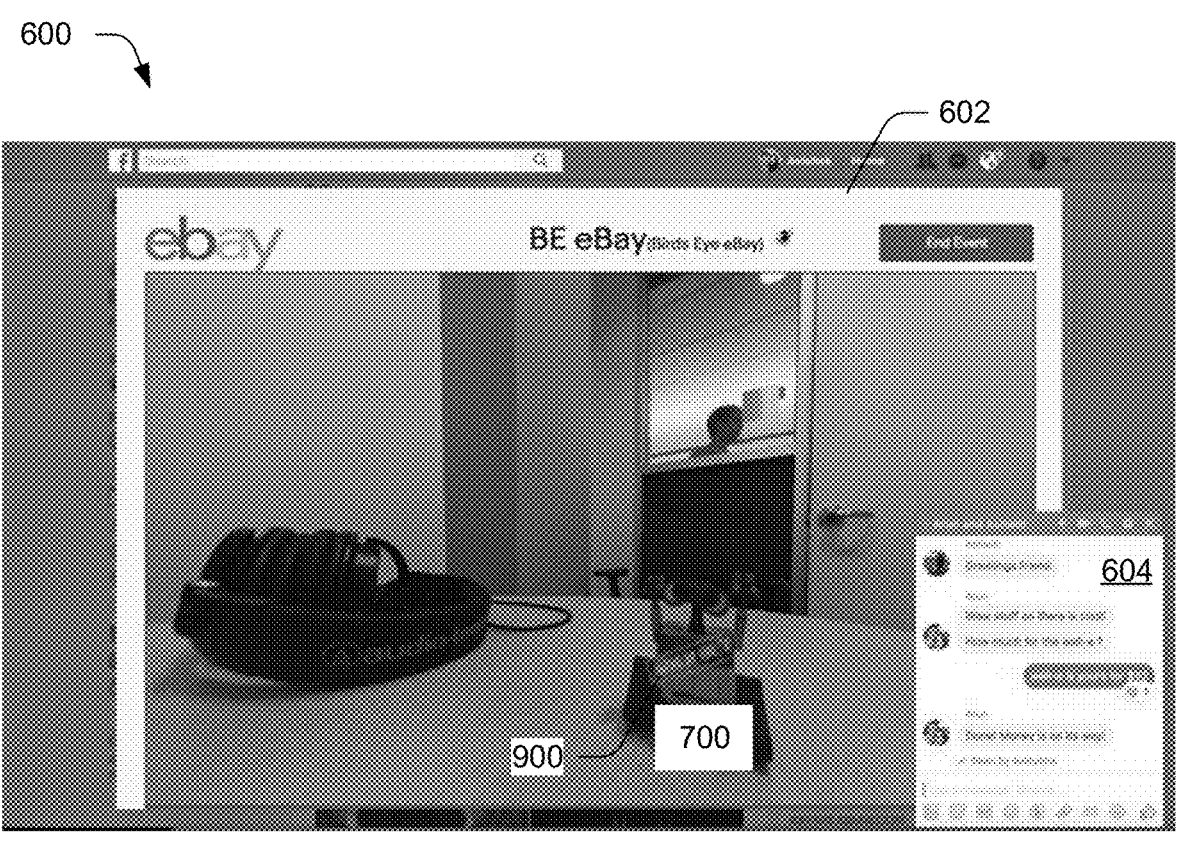
FIG. 9 illustrates an example user interface in accordance with one or more implementations.

In one or more implementations, the event loop continuously collects and updates product status based on sale, availability, and the like. As an example, consider FIG. 9.

There, an indication 900 indicates that the product has been sold or is "sold out". In addition to updating the user interface to reflect the current state of the sale, the sales listing can also be modified on the e-commerce website to indicate that the item has been sold.

Figure 10:
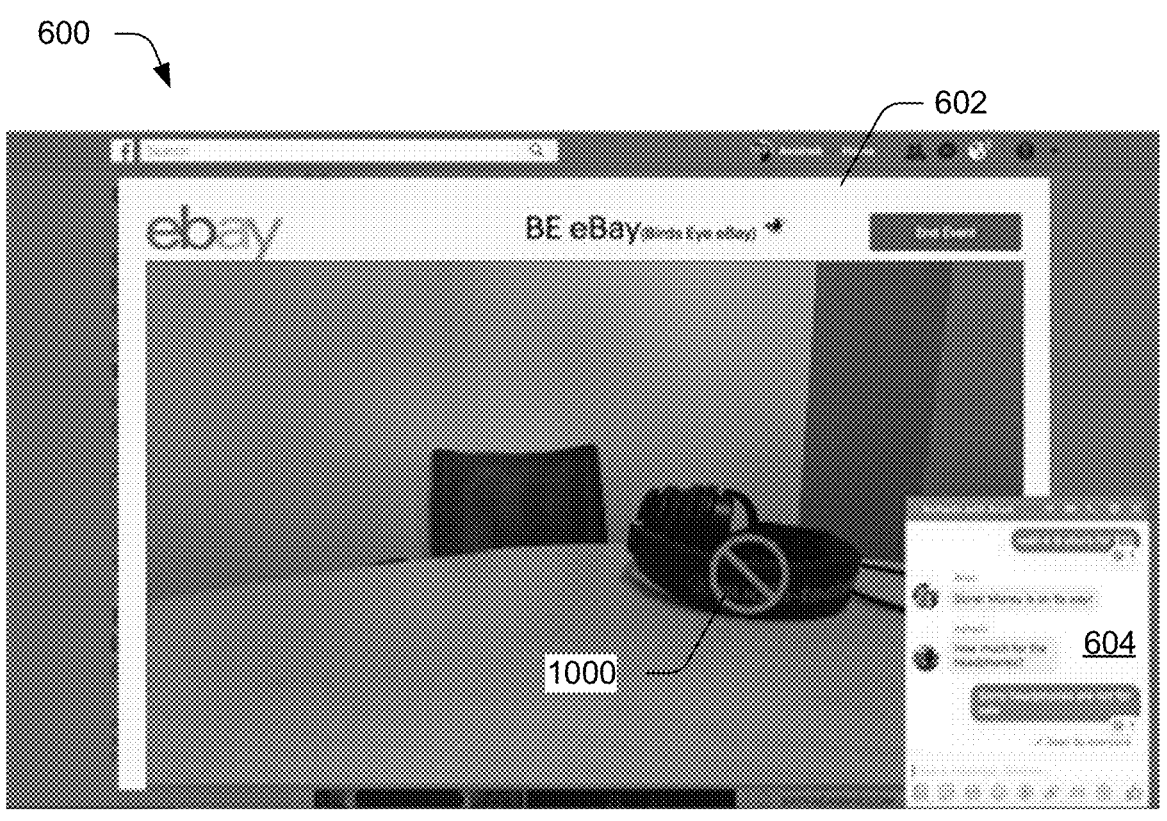
FIG. 10 illustrates an example user interface in accordance with one or more implementations.

In addition, in various implementations, conversational signals collected by the event loop can help to identify products that are not for sale but which appear in the image and/or can enable additional items to be sold and for sales listings to be created. As an example, consider FIG. 10.

There, the buyer has indicated an interest in purchasing the headphones. The event loop identifies that the seller does not wish to sell the headphones and, accordingly, places an indicator 1000 on the item to visually indicate that the headphones are not for sale.

Figure 11:
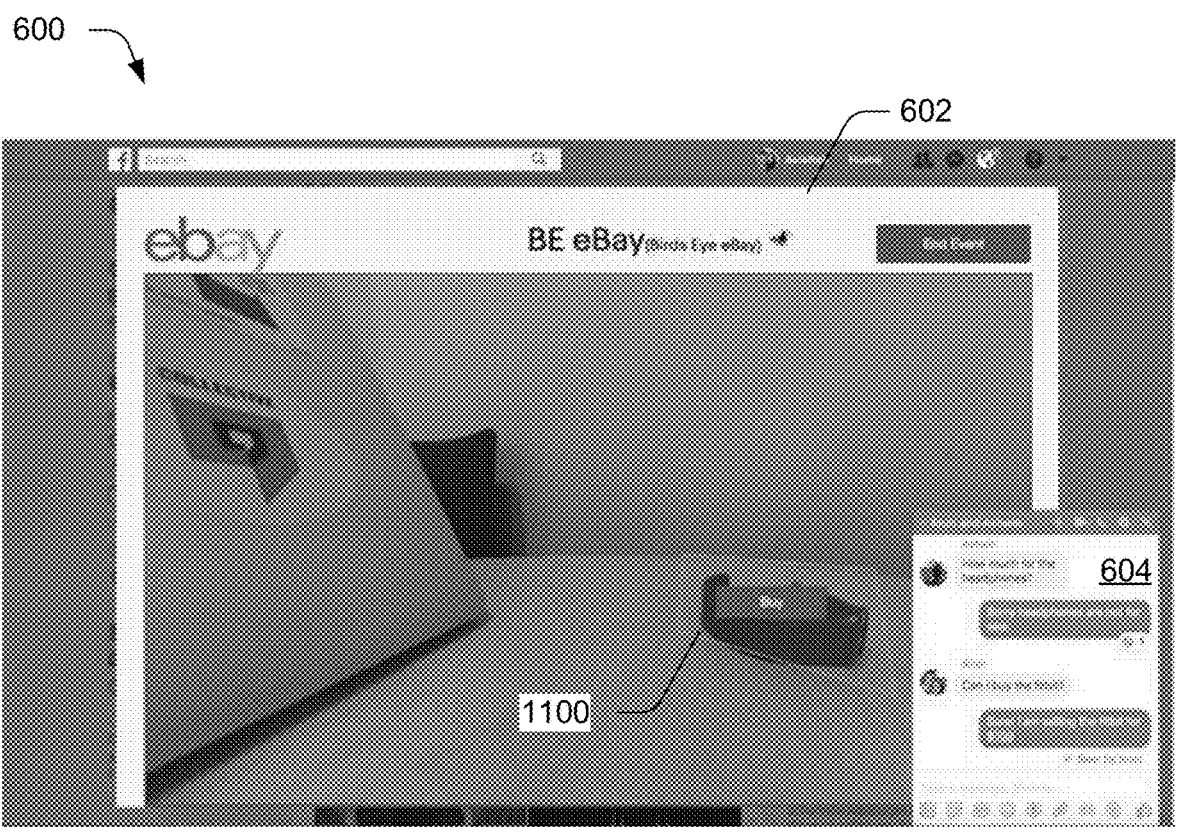
FIG. 11 illustrates an example user interface in accordance with one or more implementations.

FIG. 11, on the other hand, depicts a situation in which a real-time sales option can be created based on conversational cues developed by the event loop. In this particular case, the potential buyer learns that the headphones are not for sale, but then inquires about the fitbit by asking "Can I buy the fitbit?". The seller indicates their willingness to sell the item to the potential buyer. During this conversation, the event loop continues to develop metadata by monitoring the on-line interaction experience and creates a sales listing automatically. The system also visually identifies the item of interest by placing a shaded box around the item with an indicator "buy" to indicate that the highlighted item is the current topic of discussion between the seller and the potential buyer. The "buy" indicator can be selected by the potential buyer in order to initiate and/or complete the buying process.

Having considered the above-described implementations, consider now an example method in accordance with one or more implementations.

FIG. 12 is a flow diagram that describes operations in accordance with one or more implementations. The operations can be performed in connection with any suitable hardware, software, firmware, or combination thereof. In at least some implementations, the operations can be implemented by a system, such as those systems described above and below.

At block 1200, a user interface is presented to enable a potential seller to create an event that can be used to sell one or more items online. Any suitable user interface can be utilized, an example of which is provided above. At block 1202, a digital image is received that contains one or more item images of one or more respective items that are to be sold online by the potential seller as part of the event. Any suitable type of digital image can be received, as described above. At block 1204, social interaction between the potential seller and one or more potential buyers is enabled. The social interaction is regarding the items appearing in the digital image. In at least some implementations, the social interaction is directed to enabling the potential seller to sell the items appearing in the digital image. At block 1206, the social interaction is monitored between the potential seller and the potential buyer or buyers to extract metadata. At block 1208, sale of the one or more items appearing in the digital image is enabled. This operation can be performed in any suitable way. For example, in at least some embodiments, the sale of items is enabled by automatically creating a sales listing which is then automatically listed on an e-commerce website. Alternately or additionally, sale of the one or items is enabled by enabling a buyer to buy the item appearing in the digital image. This can be performed by, for example, providing a suitable user interface element, e.g., "buy", that is displayed on or near the particular item which, in turn, can be selected by the buyer to initiate the buying process. In at least some implementations, at block 1210, the digital image is caused to be updated based on metadata extracted by monitoring the social interaction between the potential seller and the potential buyer or buyers. Updating the image can be performed in any suitable way. For example, in some implementations, the digital image can be updated by displaying various highlights or other information on or near the item of interest. One such example, described above, includes overlaying a shaded box to highlight the item of interest. Another such example includes updating the digital image to indicate the state of the sale, i.e., "sold".

Having considered the implementations described above, consider now three different implementation scenarios that can be utilized in accordance with the principles described above. Each of these implementations scenarios can be utilized in connection with any or all of the implementations described above.

Implementation Scenarios

In the following discussion, three different implementation scenarios are described. The first implementation scenario pertains to an auction scenario where multiple bidders can bid on an item or items of interest. The second implementation scenario pertains to user interface scenarios in which different aspects of the user interface can be modified to enhance the user's experience. The third implementation scenario pertains to details associated with scaled up viewer numbers.

Auction Scenarios

In some implementations, potential buyers may be able to drive the price of a particular item up or down based on different parameters such as the condition of an item, shipping requirements, the likelihood of buyers attempting to buy an item, buyer comments on a particular item pertaining to condition or appearance, and the like. For example, if a particular item appears to be in poor condition, a potential buyer may comment on that and offer a price that is below the seller's asking price. In this instance, the interaction between the seller and the buyer can be monitored. In this case, metadata such as the buyer's offer price, positive or negative comments, and the like can be used to automatically create or modify a sales listing. For example, if a sales listing had previously been created that included the seller's asking price, a new auction price can be listed on the sales listing to indicate the potential buyer's lower bid and to reflect any comments made about the item. This information can, in turn, be used by other potential buyers to bid the price up or down.

In some instances, auction scenarios can include both a private component and a public component that operates in parallel. For example, the private component of an auction scenario can include the online social interaction between the seller and one or more potential buyers. This might occur, for example, in a chat or social networking session, or some other online instrumentality in which information and data can be exchanged between the seller and one or more potential buyers in a private or semi-private context. As described above, this information exchange can be used to develop metadata to automatically create a sales listing which can be automatically listed on an e-commerce website. Once the sales listing is automatically listed on the e-commerce website, the public component of the auction scenario can enable members of the general public to interact with the sales listing to bid the price up or down, offer comments on items, and the like. As such, changes to the sales listing can be dynamically updated as a function of both the private component in which the sales listing is adjusted based on the private or semi-private social interaction between the seller and the buyer, and the public component in which buyers bid on an item without necessarily socially interacting with the seller. To this extent then, a private component which can include a "private" or "semi-private" context, pertains to a context in which an individual or group of individuals, respectively, take part in an online social interaction with the seller. A "public" pertains to a context in which an individual or group of individuals do not take part in an online social interaction with the seller as part of the selling or auction process.

Having considered various auction scenarios, consider now user interface scenarios that can be employed in the various implementations described herein.

User Interface Scenarios

In one or more implementations, a user interface can be manipulated to highlight different items based on interest in particular item. Some examples of user interface manipulations are described above and below.

Interest in a particular item can be measured in different ways. For example, interest in a particular item may be measured based on buyers expressing an interest in the item or bidding on particular items. For example, a buyer may interact with the seller and indicate that 15 days to ship an item is undesirable. Based on this expressed sentiment, an interest level may be measured that indicates that the particular item is not as interesting to buyers as other items. In these instances, programmatic callbacks can be made to the service provider system, such as service provider system

104 in FIG. 2, to enable the system to modify the user interface in some manner. For example, the size of the item in the user interface may be reduced or a tag, other icon or color-related signal, sparkle, and the like, may be applied on or near the item to indicate the level of interest.

The user interface can also be manipulated based on the number of items that might appear in a scene. For example, if many items appear in a scene, some of which may overlap with one another, different types of visual manipulations might be used. For example, for items in which a high level of interest is registered, those items might be digitally "cut out" and separately displayed somewhere else in the user interface. The cut out approach would work quite well in the event that the digital image in which the items appear is a video. In this case, the "cut out" might include a frame that is captured and cropped to select the item, and then overlaid on the video itself. For example, items of interest may be "cut out" and displayed in a horizontal bar at the bottom of the user interface, or a vertical bar on either the left or right side of the user interface. In some instances, content of the bar is pannable or scrollable to reveal items that appear in the bar. In some instances, cut out items may be placed in the bar in a hierarchical order that is associated with the measured level of interest. For example, items that appear to have higher levels of interest may be sorted left-to-right or top-to-bottom, to indicate their place in a hierarchy. Alternately or additionally, a header or a footer might be employed in connection with an item or items in which interest is measured. The header or footer may contain information that indicates the level of interest in a particular item through any suitable manner.

In some implementations, interest can be expressed in different ways. For example, an overall viewing community's interest in a particular item or items can be measured. Such can occur to the use of any suitable parameters examples of which are mentioned above. Alternately or additionally, an individual's interest in a particular item or item can be measured. Such can occur through the use of parameters that are particular to the individual whose interest is being measured.

For example, with respect to an overall viewing community's interest, such interest can be measured by considering parameters across the viewing community such as, by way of example and not limitation, comments made by individual viewers, number of bids placed by the viewing community as measured against a threshold, number of positive or negative comments made by individual viewers making up the community as measured against a threshold, and the like. The user interface with respect to these items can then be modified to reflect the overall viewing community's interest in an item. The same or similar approach can be used with respect to an individual viewer's interest in items. Any visual instrumentalities used to highlight these items can then be tailored to reflect whether the interest is that of the overall viewing community or an individual. For example, in some instances a color-related icon (e.g., red, yellow, or green) can be used to highlight a particular item, along with multiple cascaded head and shoulders profiles to indicate that the interest is that of the overall viewing community. Similarly, in some instances the same or similar color-related icon can be used with a single head and shoulders profile to reflect the interest of an individual user. Both types of visual instrumentalities can be displayed on, for example, the seller's user interface so that the seller can ascertain, at a glance, whether interest in a particular one of their items is that of the overall viewing community or a particular individual with whom they may have an online social interaction. For the overall viewing community, the visual instrumentality can be displayed on their respective user interfaces on or near a particular item so that individuals in the overall viewing community can likewise ascertain, at a glance, the overall community interest in a particular item. In the viewing community context, this might facilitate bidding for items that appear to be popular.

In some implementations, visual instrumentalities can be used to modify the user interface with respect to a particular item by using varying degrees of luminosity or color intensity to indicate interest. For example, for items that appear to have a high level of interest, a greater degree of "glow" or "sparkle" might be used. That is, more popular items may glow brighter than less popular items.

Having considered the notion of user interface scenarios, consider now the notion of scaled up viewer numbers and how such situations can be handled.

Scaled Up Viewer Numbers

In some implementations, the number of viewers or potential buyers may escalate or scale quickly, particularly in scenarios where the item or items of interest has or have a high degree of interest. For example, in some instances a celebrity may wish to conduct a fundraiser and auction off some of their items. Once the news gets out about the celebrity auction, it is reasonable to believe that a large number of potential buyers may be interested in viewing the items, and this number may scale quickly.

In some implementations, scalability can be addressed by using so-called unique endpoints. So, for example, each item of a group of items would be associated with its own unique endpoint. The endpoint is identified by a globally unique identifier or GUID. Each unique endpoint is then associated with its own unique API call. As interest grows in an item, and as potential buyers interact with respect to a particular item or with each other as described above, API calls can be made to each unique endpoint (using the associated GUID) which, in some implementations, can be exposed by a service provider system, such as service provider system 104 in FIG. 2. These API calls can enable the service provider system to track, for each individual item, such things as the total number of potential buyers who are interested in an item, comments made about an item, and all of the information mentioned above. Scalability is promoted through the use of these individual APIs for each item because the service provider system can actively track the actual users who are actively engaged in the auction process for a particular item. This information, as it is curated and managed by the service provider system, can then be surfaced to all interested parties through a callback mechanism. The information can also be utilized to automatically modify any associated sales listings.

Having consider the example method described just above, consider now an example system and device that can be utilized to implement the described innovations.

Example System and Device

Figure 13:
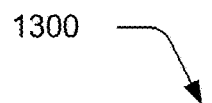
FIG. 13 illustrates an example system including various components of an example device that can be implemented as any type of computing device as described and/or utilize with reference to FIGS. 1-12 to implement embodiments of the techniques described herein.

FIG. 13 illustrates an example system generally at 1300 that includes an example computing device 1302 that is representative of one or more computing systems and/or devices that may implement the various techniques described herein. This is illustrated through inclusion of the sales listing creation module 116, aspects of which can be implemented on computing device 1302, platform 1316, or both. The computing device 1302 may be, for example, a server of a service provider, a device associated with a client (e.g., a client device), an on-chip system, and/or any other suitable computing device or computing system.

The example computing device 1302 as illustrated includes a processing system 1304, one or more computer-readable media 1306, and one or more I/O interface 1308 that are communicatively coupled, one to another. Although not shown, the computing device 1302 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1304 is representative of functionality to perform one or more operations using hardware. Accordingly, the processing system 1304 is illustrated as including hardware element 1310 that may be configured as processors, functional blocks, and so forth. This may include implementation in hardware as an application specific integrated circuit or other logic device formed using one or more semiconductors. The hardware elements 1310 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1306 is illustrated as including memory/storage 1312. The memory/storage 1312 represents memory/storage capacity associated with one or more computer-readable media. The memory/storage component 1312 may include volatile media (such as random access memory (RAM)) and/or nonvolatile media (such as read only memory (ROM), Flash memory, optical disks, magnetic disks, and so forth). The memory/storage component 1312 may include fixed media (e.g., RAM, ROM, a fixed hard drive, and so on) as well as removable media (e.g., Flash memory, a removable hard drive, an optical disc, and so forth). The computer-readable media 1306 may be configured in a variety of other ways as further described below.

Input/output interface(s) 1308 are representative of functionality to allow a user to enter commands and information to computing device 1302, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1302 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1302. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1302, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1310 and computer-readable media 1306 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1310. The computing device 1302 may be configured to implement particular instructions and/or functions corresponding to the software and/or hardware modules. Accordingly, implementation of a module that is executable by the computing device 1302 as software may be achieved at least partially in hardware, e.g., through use of computer-readable storage media and/or hardware elements 1310 of the processing system 1304. The instructions and/or functions may be executable/operable by one or more articles of manufacture (for example, one or more computing devices 1302 and/or processing systems 1304) to implement techniques, modules, and examples described herein.

The techniques described herein may be supported by various configurations of the computing device 1302 and are not limited to the specific examples of the techniques described herein. This functionality may also be implemented all or in part through use of a distributed system, such as over a "cloud" 1313 via a platform 1316 as described below.

The cloud 1314 includes and/or is representative of a platform 1316 for resources 1318. The platform 1316 abstracts underlying functionality of hardware (e.g., servers) and software resources of the cloud 1314. The resources 1318 may include applications and/or data that can be utilized while computer processing is executed on servers that are remote from the computing device 1302. Resources 1318 can also include services provided over the Internet and/or through a subscriber network, such as a cellular or Wi-Fi network.

The platform 1316 may abstract resources and functions to connect the computing device 1302 with other computing devices. The platform 1316 may also serve to abstract scaling of resources to provide a corresponding level of scale to encountered demand for the resources 1318 that are implemented via the platform 1316. Accordingly, in an interconnected device embodiment, implementation of functionality described herein may be distributed throughout the system 1300. For example, the functionality may be implemented in part on the computing device 1302 as well as via the platform 1316 that abstracts the functionality of the cloud 1314.

CONCLUSION

Various implementations described herein are able to leverage the interaction from one or more potential buyers relative to a digital image to automatically create a sales listing for items that appear to be of interest to the buyers. This reduces or eliminates all together the manual effort previously required of sellers in researching and collecting data on each item they wish to sell. Because of their technical nature, the innovative solutions described herein are also readily scalable which, in turn, greatly improves the seller's experience. Based on buyer interaction experiences, sales listings for each item for sale can be automatically created and listed.

The described innovations improve upon the current state-of-the-art for a number of different reasons. For example, the described innovations are extremely helpful and very apt for casual sellers who may not necessarily be comfortable in, or knowledgeable about identifying items that they can sell. The technical solutions described herein automatically take care of all of the details for these types of sellers. In addition, because of the technical nature of the innovations, for sellers who do not have the time to manage and list all of the items they wish to sell, the innovative solutions provide a "one-stop" process in which a single digital image can serve as the starting point for an automatically-created, automatically-listed sales listing for one or more items. The innovative technical solutions thus emphasize and promote speed, efficiency, and ease of usability for sellers.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by a computing device, the method comprising:
   monitoring interaction between users associated with a digital image that includes one or more items that are listed, in which the monitoring includes capturing computer-detectable signals of the interaction between the users;
   based at least in part on the interaction monitored, generating item metadata, in which the generating of the item metadata includes isolating a region of the digital image for the generating of the item metadata; and
   based on the item metadata, generating a user interface element for display, the user interface element corresponding to the one or more items that are listed.

2. The method as described in claim 1, wherein the interaction is at least one of a textual chat session, an online voice conversation, or a peer-to-peer conversation.

3. The method as described in claim 1, wherein the interaction monitored includes contextual data.

4. The method as described in claim 3, wherein the contextual data includes at least one of keywords or emojis.

5. The method as described in claim 1, wherein the interaction is between a user and a listing user of the one or more items that are listed.

6. The method of claim 1, wherein the generating of the item metadata comprises:
   automatically identifying, by a trained machine-learning model, at least one item depicted in the digital image;
   responsive to the identifying of the item, programmatically obtaining, from at least one electronic data source, attribute data corresponding to the at least one identified item;
   generating contextual data based on the interaction monitored; and
   updating the item metadata based on at least the attribute data and the contextual data.

7. The method as described in claim 1, wherein the generating of the item metadata is in real-time.

8. A non-transitory computer-readable storage medium storing executable instructions, which when executed by a processing device, cause the processing device to perform operations comprising:
   monitoring interaction between users associated with a digital image that includes one or more items that are listed, in which the monitoring includes capturing computer-detectable signals of the interaction between the users;
   based at least in part on the interaction monitored, generating item metadata, in which the generating of the item metadata includes isolating a region of the digital image for the generating of the item metadata; and based on the item metadata, generating a user interface element for display, the user interface element corresponding to the one or more items that are listed.

9. The non-transitory computer-readable storage medium as described in claim 8, wherein the generating of the item metadata includes using one or more machine learning techniques.

10. The non-transitory computer-readable storage medium as described in claim 8, wherein the interaction is a chat session.

11. The non-transitory computer-readable storage medium as described in claim 8, wherein the interaction monitored includes contextual data.

12. The non-transitory computer-readable storage medium as described in claim 8, wherein the interaction is an online voice conversation.

13. The non-transitory computer-readable storage medium as described in claim 8, wherein the interaction is between a user and a listing user of the one or more items that are listed.

14. The non-transitory computer-readable storage medium as described in claim 8, wherein the interaction monitored includes monitoring for contextual data.

15. The non-transitory computer-readable storage medium as described in claim 14, wherein the contextual data includes at least one of keywords or emojis.

16. A system comprising:

one or more processing systems; and one or more computer-readable storage media storing instructions which, when executed by the one or more processing systems, perform operations comprising:

monitoring interaction between users associated with a digital image that includes one or more items that are listed, in which the monitoring includes capturing computer-detectable signals of the interaction between the users;

based at least in part on the interaction monitored, generating item metadata, in which the generating of the item metadata includes isolating a region of the digital image for the generating of the item metadata; and based on the item metadata, generating a user interface element for display, the user interface element corresponding to the one or more items that are listed.

17. The system as described in claim 16, wherein the user interface element is selectable to initiate a purchase of an item of the one or more items.

18. The system as described in claim 16, wherein the interaction is at least one of a textual chat session, an online voice conversation, or a peer-to-peer conversation.

19. The system as described in claim 16, wherein the interaction monitored includes contextual data.

20. The system as described in claim 19, wherein the contextual data includes at least one of keywords or emojis.

* * * * *